(12) United States Patent
Verma et al.

(10) Patent No.: US 11,803,413 B2
(45) Date of Patent: Oct. 31, 2023

(54) MIGRATING COMPLEX LEGACY APPLICATIONS

(71) Applicant: International Business Machines Corporation, Armonk, NY (US)

(72) Inventors: Dinesh C. Verma, New Castle, NY (US); Shahrokh Daijavad, Morgan Hill, CA (US); Bijan Davari, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/110,486

(22) Filed: Dec. 3, 2020

(65) Prior Publication Data

US 2022/0179683 A1 Jun. 9, 2022

(51) Int. Cl.

| G06F 15/173 | (2006.01) |
|---|---|
| G06F 9/48 | (2006.01) |
| G06F 8/76 | (2018.01) |
| H04L 67/10 | (2022.01) |
| H04L 43/045 | (2022.01) |
| H04L 43/08 | (2022.01) |
| H04L 67/00 | (2022.01) |

(52) U.S. Cl.
CPC ............ *G06F 9/4856* (2013.01); *G06F 8/76* (2013.01); *H04L 43/045* (2013.01); *H04L 43/08* (2013.01); *H04L 67/10* (2013.01); *H04L 67/34* (2013.01)

(58) Field of Classification Search
CPC ........ H04L 43/045; H04L 43/08; H04L 67/34
See application file for complete search history.

(56) References Cited

U.S. PATENT DOCUMENTS

| 8,761,762 | B2 | 6/2014 | Jacques et al. |
| 8,949,654 | B2 | 2/2015 | Hasit |
| 9,672,054 | B1 * | 6/2017 | Gupta .................. G06F 9/5083 |
| 11,343,355 | B1 * | 5/2022 | Goela ................. H04L 41/5058 |
| 2004/0098450 | A1 * | 5/2004 | Rocchetti .................. G06F 8/61 |
| | | | 709/203 |
| 2005/0027858 | A1 * | 2/2005 | Sloth ................... H04L 41/5009 |
| | | | 709/224 |
| 2013/0254258 | A1 | 9/2013 | Agarwalla et al. |
| 2014/0289198 | A1 | 9/2014 | Chikkalingaiah |

(Continued)

FOREIGN PATENT DOCUMENTS

| CN | 111031102 A | 4/2002 |
| CN | 107018539 A | 8/2017 |

(Continued)

OTHER PUBLICATIONS

International Search Report and Written Opinion dated Jan. 29, 2022 from International Application No. PCT/CN2021/130929 filed Nov. 16, 2021.

(Continued)

*Primary Examiner* — Padma Mundur
(74) *Attorney, Agent, or Firm* — Grant Johnson

(57) ABSTRACT

A set of network traffic among a plurality of legacy applications is monitored. From the set of network traffic, a communication graph is generated for the plurality. From the communication graph, a set of migratable applications within the plurality is identified. The set of migratable applications is migrated to a cloud edge layer, and a user is notified of the migration.

20 Claims, 7 Drawing Sheets

(56) References Cited

U.S. PATENT DOCUMENTS

| | | | | |
|---|---|---|---|---|
| 2015/0096011 A1* | 4/2015 | Watt | G06F 3/0647 | |
| | | | 726/15 | |
| 2015/0193230 A1* | 7/2015 | Gaikwad | G06F 9/542 | |
| | | | 717/120 | |
| 2016/0330277 A1* | 11/2016 | Jain | H04L 67/1095 | |
| 2017/0139741 A1 | 5/2017 | Bachelor | | |
| 2020/0099773 A1* | 3/2020 | Myers | H04L 67/34 | |
| 2020/0196210 A1 | 6/2020 | Kanitkar et al. | | |
| 2022/0129295 A1* | 4/2022 | Zhang | A63F 13/50 | |

FOREIGN PATENT DOCUMENTS

| | | |
|---|---|---|
| CN | 109905859 A | 6/2019 |
| CN | 110012021 A | 7/2019 |
| CN | 110990133 A | 4/2020 |
| WO | 2022116814 A1 | 6/2022 |

OTHER PUBLICATIONS

IBM Cloud Satellite, printed Sep. 1, 2020, website, 8 pages. https://www.ibm.com/cloud/satellite.

Introducing IBM Mono2Micro, printed Sep. 1, 2020, website, IBM Cloud, 4 pages. https://www.ibm.com/cloud/blog/announcements/ibm-mono2micro.

Tak et al., "AppCloak: Rapid Migration of Legacy Applications into Cloud", 2014 IEEE International Conference on Cloud Computing, 8 pages, © 2014 IEEE.

Pahl et al., "Migration to PaaS Clouds—Migration Process and Architectural Concerns", 2013 IEEE 7th International Symposium on the Maintenance and Evolution of Service-Oriented and Cloud-Based Systems, 6 pages, IEEE, 2013.

Mohagheghi et al., "Software Engineering Challenges for Migration to the Service Cloud Paradigm: Ongoing Work in the REMICS Project", In 2011 IEEE World Congress on Services, IEEE, 2011, 8 pages.

Beserra et al., "Cloudstep: A Step-by-Step Decision Process to Support Legacy Application Migration to the Cloud", 2012 IEEE 6th International Workshop on the Maintenance and Evolution of Service-Oriented and Cloud-Based Systems (MESOCA), 10 pages.

Mell et al., "The NIST Definition of Cloud Computing", Recommendations of the National Institute of Standards and Technology, Special Publication 800-145, Sep. 2011, 7 pages.

\* cited by examiner

MIGRATING COMPLEX LEGACY APPLICATIONS

BACKGROUND

The present disclosure relates generally to the field of application migration, and more particularly to migrating complex legacy applications.

In enterprise environments, complex legacy applications may be commonplace. These applications can be difficult to migrate because components of the applications may be intricately interconnected with other applications—legacy or otherwise. This may result in expensive operations and an inability to take advantage of new technologies, such as cloud-based applications.

Current solutions for migrating complex legacy applications require manual engineering processes or the rewriting of significant components using new architectural paradigms, such as containers, Service Oriented Architecture (SOA) or microservices. Alternatively, a proposed solution includes integration of system layer rewrites which can migrate native applications into a cloud mode, so long as the entire collection of applications and components can be migrated together. The state-of-the-art in moving an entire application to the cloud includes using Artificial Intelligence (AI) for automatic application refactoring.

The above approaches can only be successful in settings where moving an application is relatively simple (e.g., where the application has few or no dependencies with other applications), or where migration does not impose changes in dependencies or other timing issues among multiple applications. The manual software engineering approaches are tedious, slow, and subject to human error.

Current approaches simply do not work well in realistic environments where many legacy components and applications have complex dependencies among themselves, and an enterprise's full application suite may become fragile/unstable due to implicit assumptions in legacy components/applications, especially regarding the timing of various interactions among the applications.

SUMMARY

Embodiments of the present disclosure include a method for migrating complex applications. The method includes monitoring a set of network traffic among a plurality of legacy applications. From the set of network traffic, a communication graph is generated for the plurality. From the communication graph, a set of migratable applications within the plurality is identified. The set of migratable applications is migrated to a cloud edge layer, and a user is notified of the migration.

The method may further include monitoring a second set of network traffic occurring between the set of migratable applications and a remainder of the plurality. In response to the monitoring, at least one timing error is determined to have occurred. At the cloud edge layer, a network rate control filter is introduced. A criteria of the network rate control filter is based on the at least one timing error. A user is notified of the criteria.

Embodiments of the present disclosure include a computer program product for migrating complex applications. The computer program product comprises a computer readable storage medium having program instructions embodied therewith. The program instructions are executable by a device and cause the device to monitor a set of network traffic among a plurality of legacy applications. From the set of network traffic, a communication graph is generated for the plurality. From the communication graph, a set of migratable applications within the plurality is identified. The set of migratable applications is migrated to a cloud edge layer, and a user is notified of the migration.

The program instructions of the computer program product may further cause the device to monitor a second set of network traffic occurring between the set of migratable applications and a remainder of the plurality. In response to the monitoring, at least one timing error is determined to have occurred. At the cloud edge layer, a network rate control filter is introduced. A criteria of the network rate control filter is based on the at least one timing error. A user is notified of the criteria.

Embodiments of the present disclosure include a system for migrating complex applications. The system comprises a memory subsystem, with program instructions included thereon, and a processor in communication with the memory subsystem. The program instructions cause the processor to monitor a set of network traffic among a plurality of legacy applications. From the set of network traffic, a communication graph is generated for the plurality. From the communication graph, a set of migratable applications within the plurality is identified. The set of migratable applications is migrated to a cloud edge layer, and a user is notified of the migration.

The program instructions may further cause the device to monitor a second set of network traffic occurring between the set of migratable applications and a remainder of the plurality. In response to the monitoring, at least one timing error is determined to have occurred. At the cloud edge layer, a network rate control filter is introduced. A criteria of the network rate control filter is based on the at least one timing error. A user is notified of the criteria.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
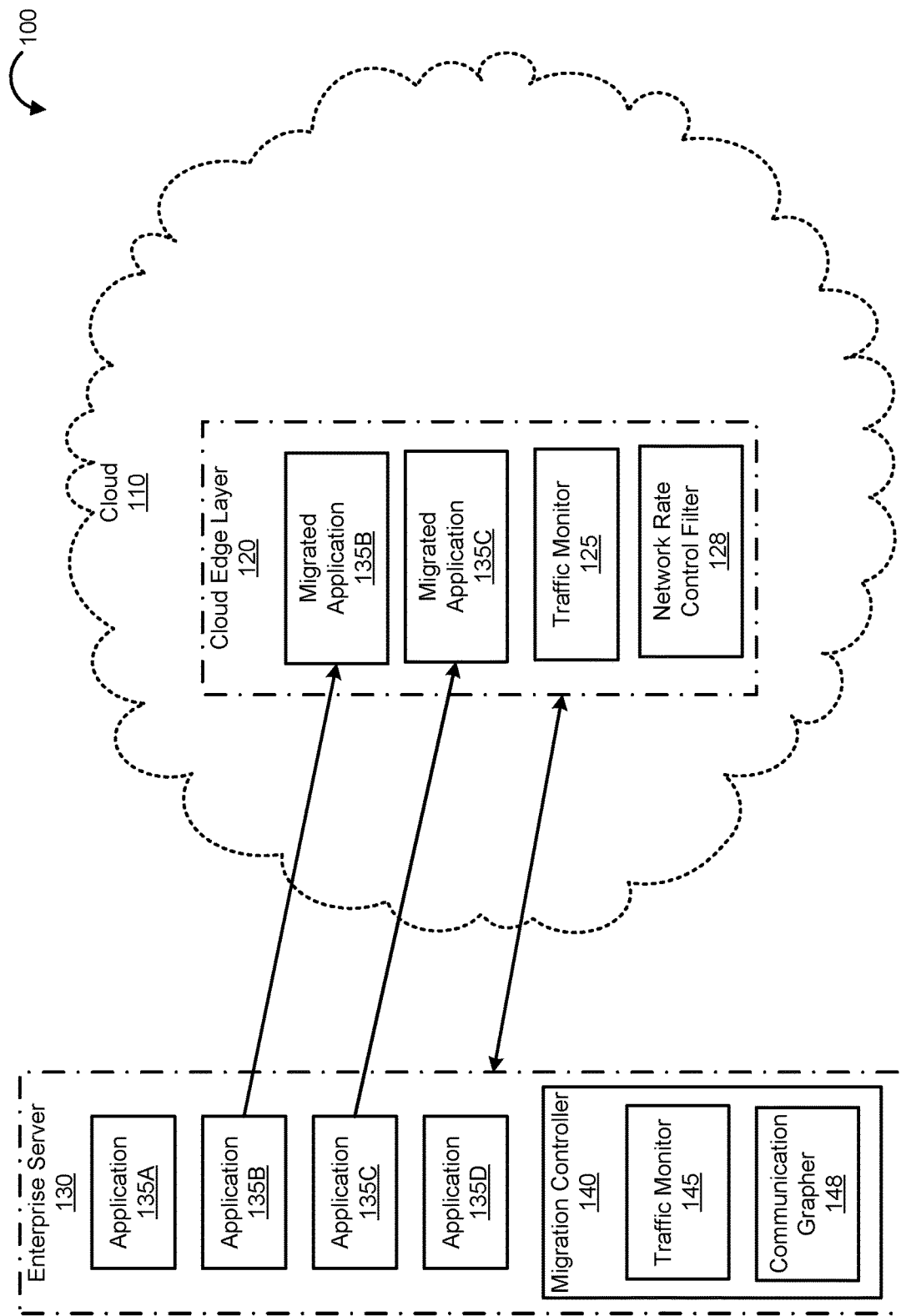
FIG. 1 illustrates an example network environment for migrating complex legacy applications to a cloud edge layer, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of application migration, and more particularly to migrating complex legacy applications. While the present disclosure is not necessarily limited to such applications, various aspects of the disclosure may be appreciated through a discussion of various examples using this context.

As discussed above, the current state of the art creates a desperate need for the ability to migrate complex, interdependent legacy applications to a cloud, or hybrid cloud, platform in a way that can both be automated and mitigate timing dependencies among migrated and non-migrated components of an enterprise's suite of legacy applications and their components.

An edge layer of a cloud computing architecture may be an ideal environment for complex legacy applications, as it provides local resources with low latencies. The "edge layer" of the cloud may include cloud computing resources that are located as close as possible to the client devices accessing the cloud computing resources. Shortening the physical distance between the client devices and the cloud may lead to low latency and greater efficiency. Edge layer may be located at the premises where components of the legacy application is running, and such premises may be instantiated as a data center, an enterprise site, a private cloud hosting site, or an outsourced data center.

An existing legacy application residing, for example, on the server of an enterprise, can be a complex set of interacting applications and their components. Components of an application may interact via a variety of protocols created any number of years in the past. The components and/or protocols may use older programming languages, and assumptions about timing and the responsiveness of related applications may be poorly documented, if at all. Timing dependencies among applications and application components may therefore not be available or may be incomplete. These legacy applications may nevertheless be essential to the operations of any given enterprise.

When a need to migrate a legacy application to a new system or cloud environment arises, the migration of all the components of a given application (or a suite/plurality of applications) is rarely attempted, as the number of errors, especially timing dependency errors between the migrated and non-migrated components/applications, may overwhelm developers and other staff, and negatively impact the operation of the enterprise. In some instances, this may cause a cascade of failures resulting in a catastrophic event.

To illustrate the impact of the contemplated embodiments, let us assume we have 10 applications in an enterprise, each comprising 10 components. Let us further assume that one application has been selected for migration to a cloud computing environment. If two of the components of the selected application are also being utilized by one or more of the non-migrating applications, the migration of the selected application may slow the operation of the non-migrating applications which utilize the selected application. The greater the number of non-migrating applications that utilize/depend upon the selected application, the greater (and potentially exponential) the slowing impact becomes for the plurality of the enterprise's applications.

In addition to slowing, the risk of application/component failure increases as well. Legacy applications may rely on the timing characteristics and dependencies of the components/applications as they were in the local environment on the enterprise's local server, and if a component is suddenly 100 ms further away, as opposed to an original position of 2 ms away, the related/associated applications/components may time out in unexpected ways.

A similar challenge may also arise if an application/component is kept on-premises (e.g., on the local enterprise server), but updated to a new implementation which runs faster/more efficiently than the previous implementation/version. The older/non-updated components/applications may experience timing issues leading to code paths that have never been executed/tested before, which may cause the application to crash. This may lead to a failure of the migration process. In other words, both operating too fast and operating too slowly may cause complex legacy applications to fail.

Embodiments of the present disclosure contemplate the use of at least three technologies/techniques to mitigate the above issues and to accelerate and automate the migration of complex legacy applications. First, the use of passive network inspections may be employed to determine the topology of components that make up each complex application. Passive network inspection may further be utilized to determine characteristics of the communications among the applications/components (e.g., server addresses, port addresses, protocol type, network latency, traffic volume, encryption types, etc.).

Second, a network communication graph may be generated from the results of the passive network inspection. Using the communication graph, processes may be grouped to identify the various components/applications, and to identify timing dependencies and the degree of application complexity. Using the communication graph, the complex legacy applications may be ranked or compared to a migration threshold criteria to determine the best candidate(s) for migration (e.g., migratable application(s)) The criteria may consider, for example, the amount of interdependency, the volume of network traffic associated with a particular process/component/application, etc.

Lastly, network rate control filters may be used (e.g., in a cloud edge layer environment) to ensure that any particular component/application can operate within the post-migration environment. The network rate control filters may be tailored for each component/application and may allow the migrated component/application to bypass timing dependent failures, which are among the leading causes of migration failures.

In embodiments, it may be assumed that some of the components/applications may be identified, as they may likely be running in a data center with a relatively well-defined structure that may be accounted for during passive network inspection. By monitoring the network traffic in this environment, a set of processes/components/applications may be identified by listening on various communication ports that are communicating with each other. For example, a server component of an application may be identified by server address and port number. The port number may be used to identify client requests by that component, leading to the identification of process elements on the network. Analyzing the communications of the various processes allows for the generation of a communication graph among the different components of an application or applications. In addition, the characteristics of the communications among components may be determined, including network latency, volume of data packets/network traffic, etc. In other embodiments, the monitoring of the network traffic may happen among components running on a single server, e.g. among components running as virtual machines on a physical machines, among components running as logical partitions on a mainframe, among components running as containers within a virtual local network such as a DOCKER container on a DOCKER network etc.

According to embodiments, once the interacting processes are identified and the communication graph is generated, the various applications may be determined/identified by analyzing the communication graph. An analysis of the communication graph may identify groups of processes acting in concert or in a manner typical of a component, an entire application, or multiple applications. This analysis may be done using one or more of the following approaches—determining clusters of nodes in communications graphs that are similar, determining minimum cut partitions of communication graphs, determine cliques or weighted partitions of nodes in the communication graph, etc. These process groups may be further analyzed to identify applications with shared components and/or processes, as well as the volume of network traffic exchanged among them.

In embodiments, the results of a process group analysis may include the identification of each application, as well as the components of each application that communicate over the monitored network. As such, these results may be used to determine which of the components/applications are best suited for migration to a cloud or cloud edge layer. In hybrid cloud embodiments, it may be assumed that only a portion of the legacy components/applications may be migrated.

By analyzing the communication graph and the process group analysis results, components/applications with the fewest links/dependencies with other components/applications may be selected for migration, as these components/applications will likely have the least effect on the plurality of legacy applications. In some embodiments, this may include a threshold check (e.g., comparison to a migration threshold criteria). The criteria may be determined by a user/administrator, or it may be automated as a percentage of total network traffic volume over a period of time, as a priority-based system of application importance, as a result of a machine learning model determination of the best component(s)/application(s) to migrate, etc. In some embodiments, this may include checking against a set of migration policies which may be determined by a user/administrator. The migration policies may define conditions under which migration is allowed and conditions under which migration should be avoided.

In embodiments, a cloud edge layer environment may be the destination for migration. In this way, it may be ensured that the links between the migrating component(s)/application(s) and the non-migrating component(s)/application(s) are maintained. Such an embodiment may be a permanent solution, or, in embodiments, the cloud edge layer may be utilized as an intermediary stage towards integration into a traditional cloud environment.

In embodiments, the cloud edge layer hosting the migrated component(s)/application(s) may include an appliance based on the same architecture as the native/originating/legacy environment of the migrated component(s)/application(s). For example, a SYSTEM Z appliance for a mainframe application, or IBM CLOUD SATELLITE for Linux-based applications, could be implemented within the cloud edge layer. In this way, the cloud edge layer may ensure the latency between the migrated and non-migrated components/applications remains unchanged.

In some embodiments, a component/application may fail due to an updated component/application reacting too quickly and causing unexpected timing conditions. Some embodiments may incorporate network rate control filters to mitigate or alleviate these issues. For example, the cloud edge layer may introduce, via the network rate control filter(s), network latencies to ensure the latencies experienced among the migrated components/applications and the non-migrated components/applications falls within the range of delays observed in the communication graph or in the native, pre-migration environment. In this way, the complex system of legacy applications may continue to operate with the same timing constraints and assumptions as were present in the native environment, thus preventing and/or resolving timing errors.

Referring now to FIG. 1, illustrated is an example network environment 100 for migrating complex legacy applications to a cloud edge layer, in accordance with embodiments of the present disclosure. Example network environment 100 may include, for example, cloud 110, cloud edge layer 120, and enterprise server 130. In some embodiments, certain functions of cloud 110, cloud edge layer 120, and enterprise server 130 may be implemented at a location different from the depiction.

According to embodiments, the cloud 110, cloud edge layer 120, and enterprise server 130 may be comprised of computer systems (e.g., may contain the same or similar components as computer system 601). The cloud 110, cloud edge layer 120, and enterprise server 130 may be configured to communicate with each other through an internal or external network interface (not shown). The network interfaces may be, e.g., modems, wireless network adapters, Ethernet adapters, etc. The cloud 110, cloud edge layer 120, and enterprise server 130 may be further equipped with displays or monitors (not shown). Additionally, the cloud 110, cloud edge layer 120, and enterprise server 130 may include optional input devices (e.g., a keyboard, mouse, scanner, or other input device), and/or any commercially available or custom software (e.g., image processing software, object identification software, etc.). In some embodiments, cloud 110, cloud edge layer 120, and enterprise server 130 may include additional servers, desktops, laptops, IoT (Internet of Things) devices, or hand-held devices.

Cloud 110, cloud edge layer 120, and enterprise server 130 may further include storage (e.g., storage interface 614). The storage may include, for example, virtualized disk drives, physical hard disk drives, solid state storage drives, or any other suitable storage media. In some embodiments, workload data and metadata may be stored, temporarily or permanently.

The cloud 110, cloud edge layer 120, and enterprise server 130 may be distant from each other and may communicate over a network (not shown). In embodiments, the cloud 110 may be a central hub from which cloud edge layer 120 and enterprise server 130 can establish a communication connection, such as in a client-server networking model. In other embodiments, cloud edge layer 120 may act as such a hub for the enterprise server 130 and the cloud 110. In some embodiments, the cloud 110, cloud edge layer 120, and enterprise server 130 may be configured in any other suitable network relationship (e.g., in a peer-to-peer configuration or using another network topology).

In embodiments, the connections among the components of networking environment 100 can be implemented using any number of any suitable communications media. For example, a wide area network (WAN), a local area network (LAN), the Internet, or an intranet. In certain embodiments, the cloud 110, cloud edge layer 120, and enterprise server 130 may be local to each other and communicate via any appropriate local communication medium. For example, the cloud 110, cloud edge layer 120, and enterprise server 130 may communicate using a local area network (LAN), one or more hardwire connections, a wireless link or router, or an intranet. In some embodiments, cloud 110, cloud edge layer 120, and enterprise server 130, and any other devices, may be communicatively coupled using a combination of one or more networks and/or one or more local connections. For example, the enterprise server 130 may be hardwired to the cloud edge layer 120 (e.g., connected with an Ethernet cable) while a third client device may communicate with the enterprise server 130 over a network, such as an intranet or the Internet.

In some embodiments, the network environment 100 can be implemented within, or as a part of, a cloud computing environment. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over a network. Further detail regarding cloud computing is given with respect to FIGS. 4 & 5.

According to embodiments, enterprise server 130 may include applications 135A-D. Applications 135A-D may include, for example, legacy applications and their components/processes. Legacy applications may include e-mail clients, internet browsers, databases, block chain applications, machine learning models, artificial intelligence applications, streaming applications, or any other application utilized by an enterprise entity. In some embodiments, applications 135A-D may be candidates for migration to cloud edge layer 120, as discussed herein. As depicted, applications 135A & D may be non-migrating applications, and applications 135B-C may be migrating applications (e.g., may be substantially similar, or even identical, to migrated applications 135B-C).

According to embodiments, enterprise server 130 may further include a migration controller 140. In some embodiments, migration controller 140 may be located within cloud edge layer 120 or outside of the cloud edge layer 120, but still within cloud 110. Migration controller may include a traffic monitor 145 (e.g., for performing passive network inspections, as described herein) and communication grapher 148 (e.g., for generating a communication graph, as described herein).

According to embodiments, cloud edge layer 120 may include migrated applications 135B-C. As described herein, migrated applications may be migrated implementations of applications 135B-C. Migrated applications 135B-C may be updated for the environment of cloud edge layer 120, and/or the cloud edge layer 120 may include an appliance to mimic the native environment of the enterprise server 130.

In embodiments, cloud edge layer may further include traffic monitor 125. Traffic monitor may be substantially similar to traffic monitor 145. Traffic monitor 125 may monitor the network traffic within the cloud edge layer 120 and/or among the applications 135A & D and migrated applications 135B-C to detect timing errors and other issues that may be mitigated or resolved through the introduction of increase latencies. In some embodiments, network rate control filter 128 may introduce and enforce these mitigating latencies, as described herein.

Cloud 110 may include cloud edge layer 120 and other cloud computing components. Additional detail regarding cloud 110 and its components is given with regard to FIGS. 4 and 5.

It is noted that FIG. 1 is intended to depict the representative major components of an example network environment 100. In some embodiments, however, individual components may have greater or lesser complexity than as represented in FIG. 1; components other than or in addition to those shown in FIG. 1 may be present, and the number, type, and configuration of such components may vary.

Figure 2A:
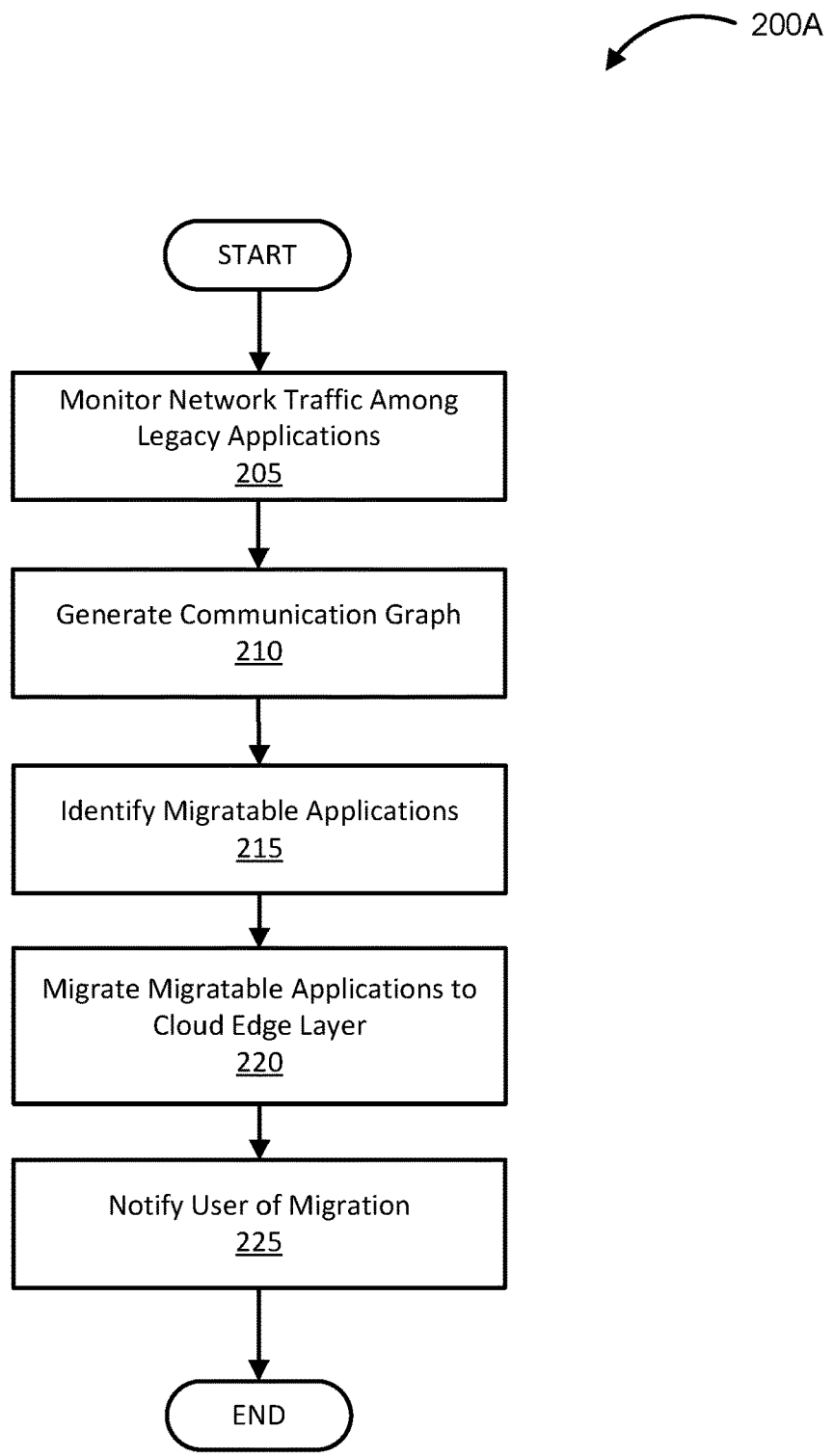
FIG. 2A illustrates an example method for migrating complex legacy applications, in accordance with embodiments of the present disclosure.

Turning now to FIG. 2A, illustrated is a flowchart of an example method 200A for migrating complex legacy applications, in accordance with embodiments of the present disclosure. Example method 200A may begin at 205, where network traffic among legacy applications is monitored. As discussed herein, passive network inspection techniques may be utilized in the monitoring, and the monitoring may be performed in the native environment of the legacy applications (e.g., within the environment of enterprise server 130).

At 210, a communication graph is generated. As described herein, the communication graph may include communication characteristics and an enumeration of the components/processes of the applications, and may further illustrate the relationships among processes, components, and applications. Communication characteristics may include the amount of traffic in bytes or connections establishment over some period of time, distribution of communication network protocols in the traffic, or parameters of any model describing the attributes of the communication.

At 215, migratable applications are identified. As described herein, migratable applications may include a portion of the total number of legacy applications, and migratable applications may be determined/identified using a migration threshold criteria.

At 220, the migratable applications may be migrated to a cloud edge layer (e.g., cloud edge layer 120). In embodiments, the migration may be performed hot or cold. In a hot migration, actively running components are migrated seamlessly. In a cold migration, application components are shut down and restarted in the new environment. In some embodiments, the migration of a subset of components of an application may be performed hot, while the remainder of the components' migration may be performed cold. As described herein, the cloud edge layer may include the virtual/physical machines within the cloud 110 that are closest (either physically/geographically or logically) to the physical location of enterprise server 130. In some embodiments, logical closeness/distance may be measured by lowest latency or by communication compatibility. As described herein, the cloud edge layer 120 may include an appliance to mimic the native environment of the migrated applications, and/or it may include a network rate control filter.

At 225, a user is notified of the migration. In embodiments, the user may be an administrator, developer, end user, etc., and the notification may be accomplished through popup window, text, email, audio sound, visual cue, tactile cue, etc. In some embodiments, the user may be asked to respond to the notification to finalize the migration. In some embodiments, the user may modify the set of components that are migrated. In some embodiments, the notification and confirmation may happen before the process of migration is initiated.

Figure 2B:
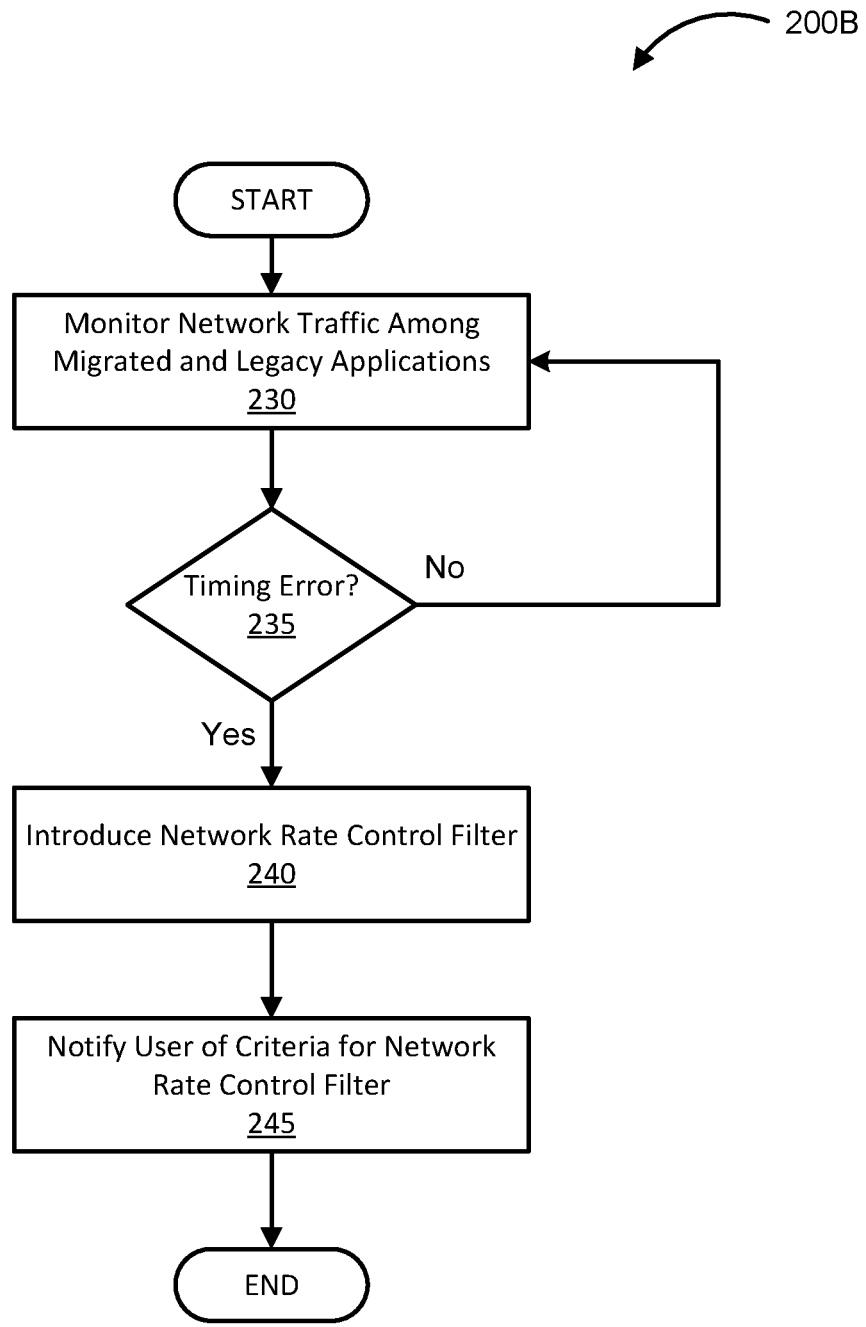
FIG. 2B illustrates an example method for mitigating timing errors among complex applications, in accordance with embodiments of the present disclosure.

Turning now to FIG. 2B, illustrated is an example method 200B for mitigating timing errors among complex applications, in accordance with embodiments of the present disclosure. In embodiments, example method 200B may occur after, or in response to, example method 200A. Example method 200B may begin at 230, where the network traffic among migrated and non-migrated legacy applications is monitored, as described herein.

At 235, it is determined whether a timing error could occurred, as described herein. In embodiments, this may include a determination from the raw data produced by the monitoring, or it may be determined from a communication graph generated from the monitoring. In yet other embodiments, the determination may be made by a prediction generated by a machine learning model as to the realistic operation of a migrated application within a cloud edge layer. In yet other embodiments, timing errors could be avoided by determining thresholds of communication which are safe because no error notifications are observed during activity with the specific threshold rates of communication. In some embodiments, timing or other kinds of errors are observed, and network characteristics which cause those errors are marked as ones to avoid.

If, at 235, no timing error is determined, the method may continue to monitor network traffic at 230. If, however, a timing error is determined to have occurred or will occur, or if the network has been monitored sufficiently well to determine safe criteria for the network to operate without timing errors, the method may proceed to 240, where a network rate control filter 128 is introduced. As described herein, the network rate control filter may be introduced at a cloud edge layer to introduce latency at the migrated applications. However, in some embodiments, a network rate control filter may be introduced at an enterprise server to introduce latency at the non-migrated remainder of the legacy applications.

At 245, a user is notified of the criteria for the network rate control filter. In some embodiments, the criteria of the network rate control filter may include the communication characteristics and introduced latencies for each process, component, and/or application affected by the network rate control filter.

Figure 3:
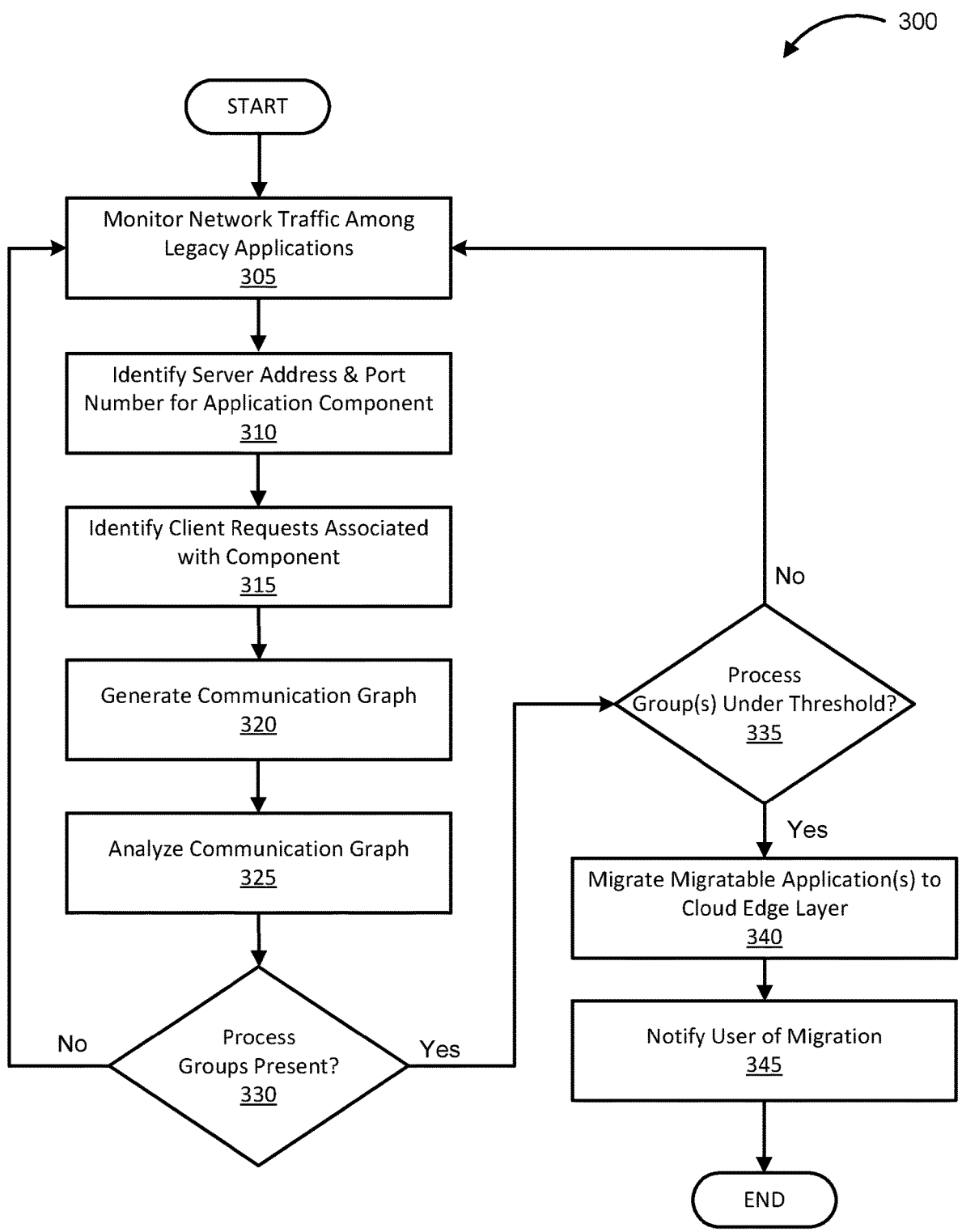
FIG. 3 illustrates an example method for migrating complex legacy applications according to a communication graph, in accordance with embodiments of the present disclosure.

Turning now to FIG. 3, illustrated is an example method 300 for migrating complex legacy applications according to a communication graph, in accordance with embodiments of the present disclosure. Example method 300 may begin at 305, where network traffic among legacy applications is monitored to identify processes executing over the network, as described herein.

At 310, the server addresses and port addresses/numbers for the processes and/or components may be identified, according to the results of the monitoring, and as described herein.

At 315, client requests associated with the component and/or process are identified, based on the server addresses and port numbers identified. This may include, for example, determining the origin/destination addresses/port numbers associated with the client requests.

At 320, a communication graph is generated, as described herein. In embodiments, a generated communication graph may include, for example, communication characteristics, network traffic volumes, latencies, origins/destinations of data packets, etc.

At 320, the communication graph is analyzed. Analyzing the communication graph may include, for example, a determination of the origin and destination of each data packet sent among the application(s), network traffic volume, hardware component identifications (e.g., MAC address designation, IP address(es), network latencies, etc.) as described herein.

At 330, it is determined whether the monitored processes/components form a clique or group, according to the communication graph. If no, the example method 300 may return to 305; alternatively, the example method 300 may end. If yes, the process groups may be compared to a migration threshold criteria at 335.

If, at 335, it is determined the process group(s) exceed a migration threshold criteria, as described herein, the example method 300 may return to 305. Alternatively, the example method 300 may end. If, however, if it is determined that the process group(s) fall under the migration threshold criteria, the method may proceed to 340.

At 340, the applications containing the process group(s) may be migrated, as migratable application(s), to a cloud edge layer, as described herein.

At 345, a user is notified of the migration, as described herein.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
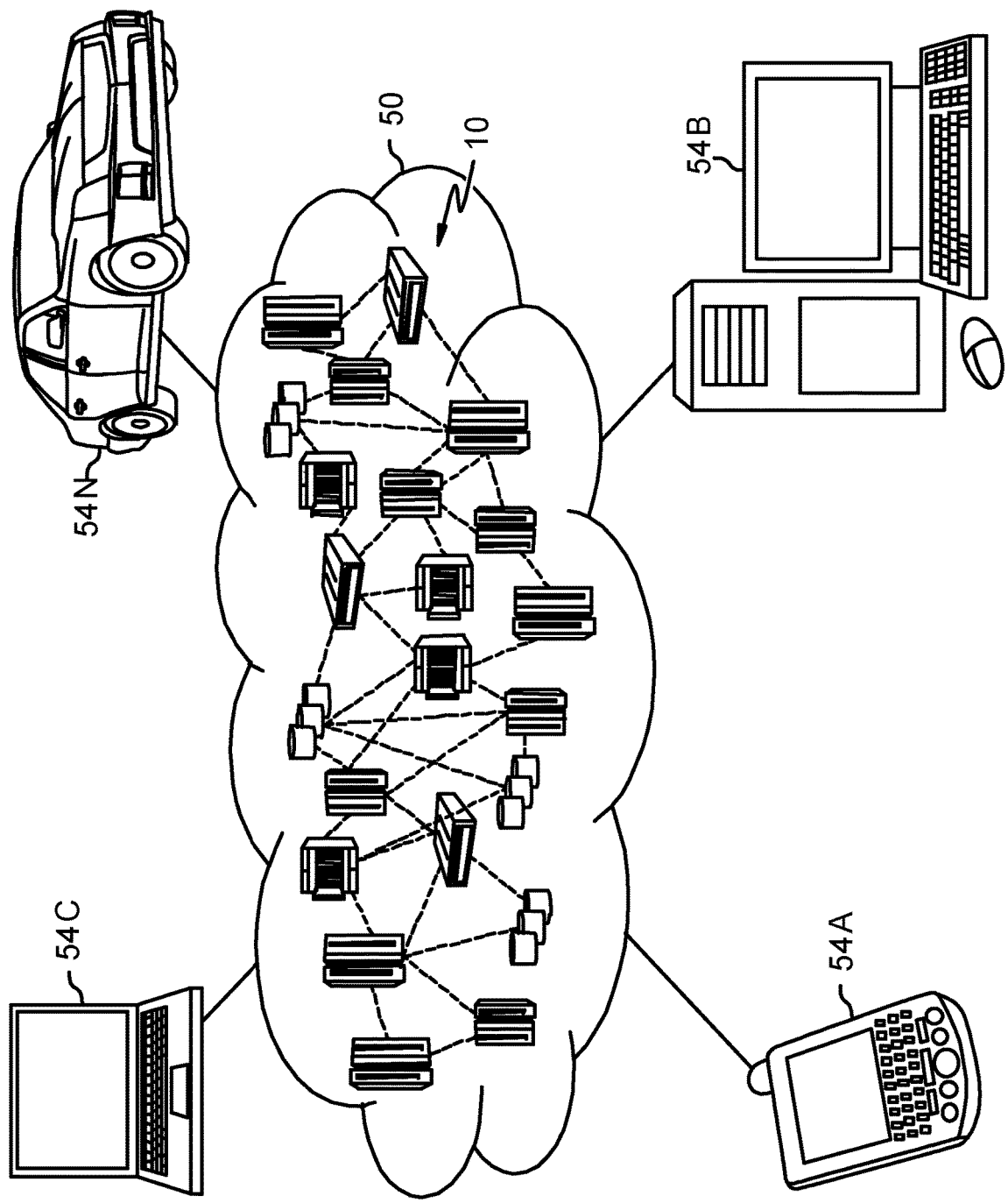
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
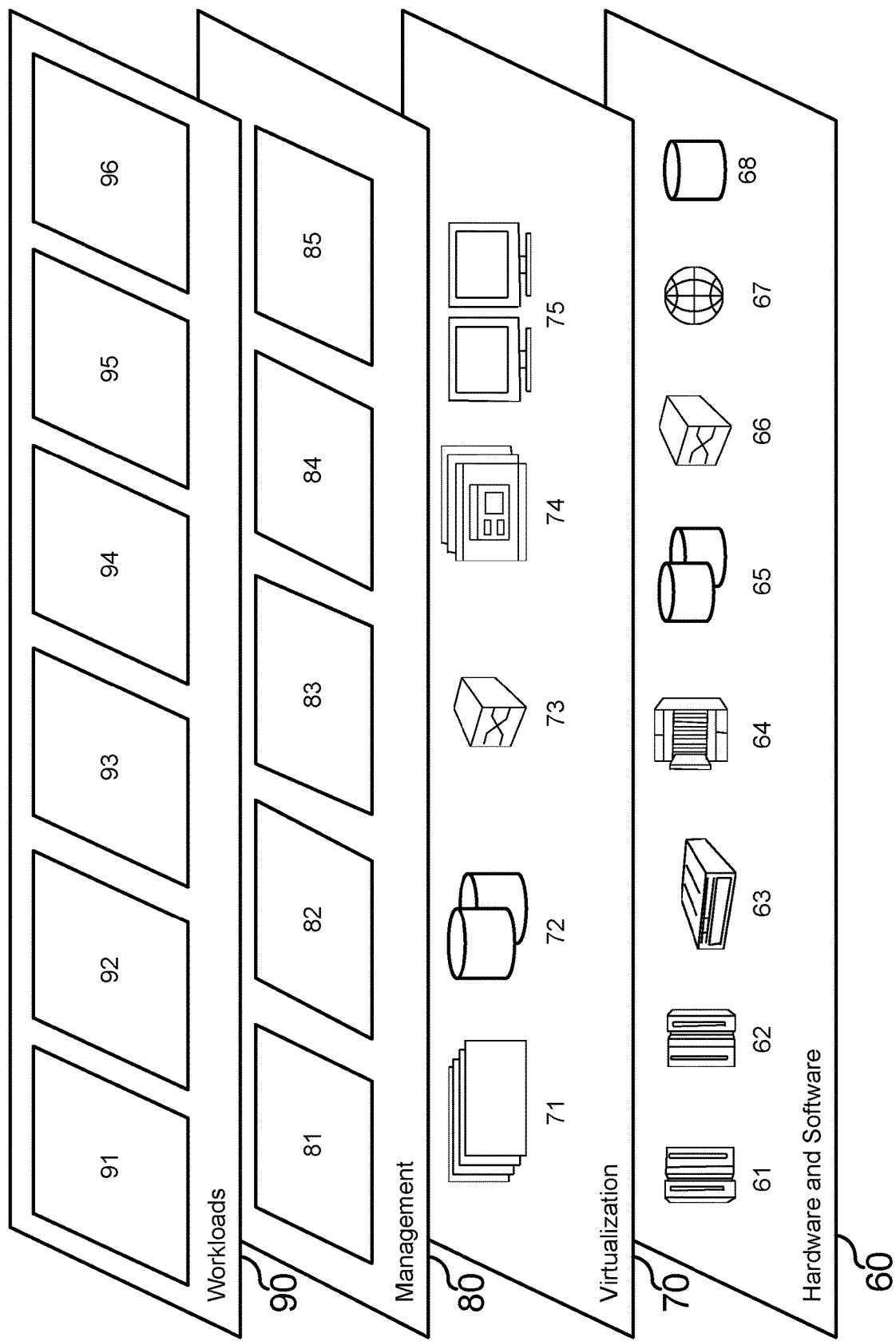
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and complex application migration 96.

Figure 6:
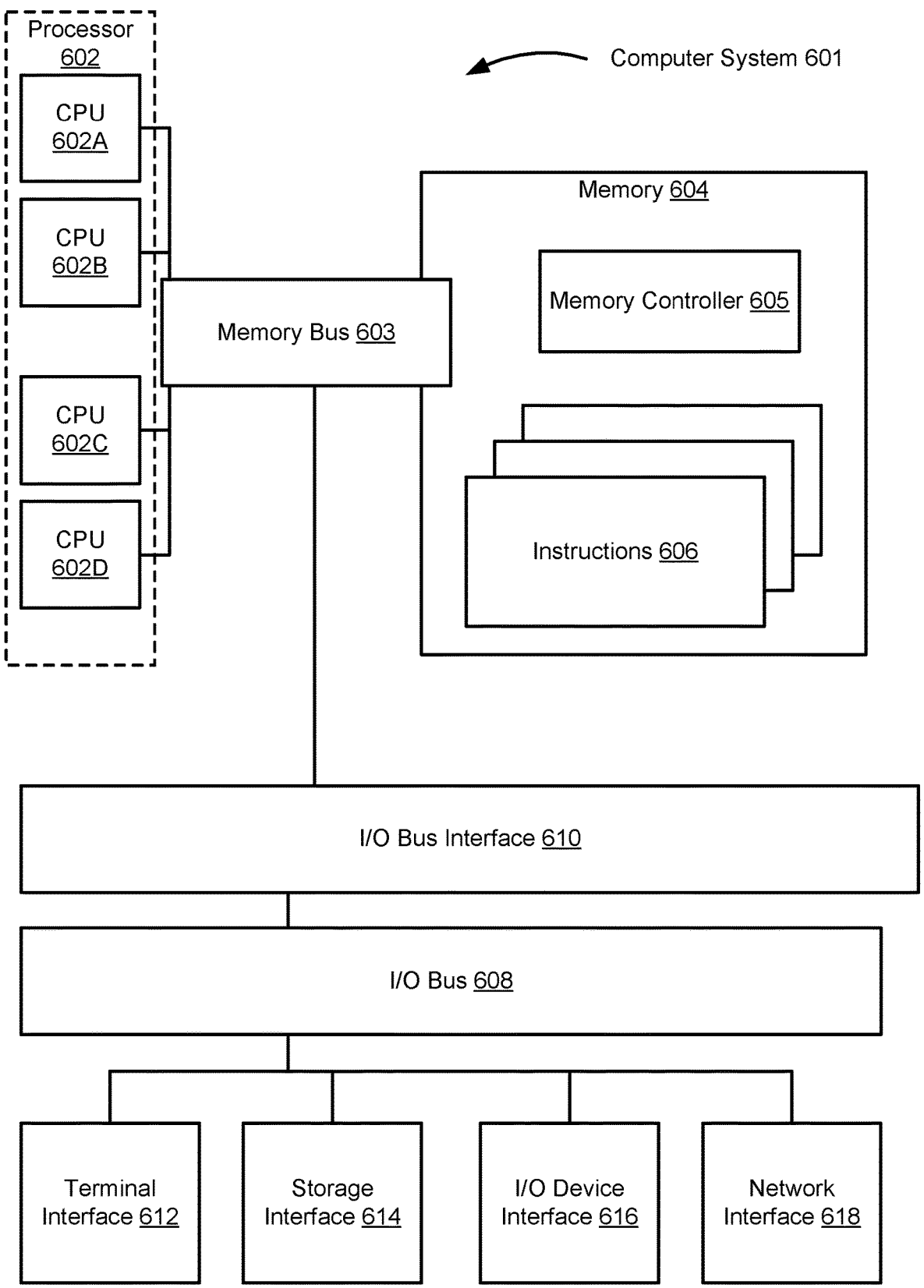
FIG. 6 depicts a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, methods 200A-B/300, described in FIGS. 2A-B and 3. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 2A-B and 3.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601 and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for migrating complex applications, the method comprising:
    monitoring a set of network traffic among a plurality of applications, wherein each of the plurality of applications comprises a plurality of components and wherein at least some of the components are interconnected with other applications;
    generating, from the set of monitored network traffic, a communication graph, wherein the communication graph includes an average latency between the respective pluralities of components and other applications;
    identifying, from the average latencies of the communication graph, some of the components and other applications for migration;
    migrating the identified components and the identified other applications to an edge layer; and
    notifying a user of the migration.

2. The method of claim 1, wherein generating the communication graph further comprises:
    identifying a server address and a port number for each of the components and other applications;
    identifying, using the server address and the port number, a set of client requests associated with each of the components and other applications; and
    generating, from the identified set of client requests, the communication graph.

3. The method of claim 2, wherein the communication graph further includes:
    a set of addresses and port numbers correlating to a set of origins for the set of client requests;
    a set of addresses and port numbers correlating to a set of destinations for the set of client requests; and
    a volume of network traffic.

4. The method of claim 3, wherein identifying the migratable components and other applications further comprises:
    analyzing the communication graph to identify one or more groups of related components and other applications; and
    determining, from the one or more groups of related components and other applications, a set components and other applications for migration.

5. The method of claim 4, wherein the edge layer includes an appliance based on native architecture of a first application from the migratable components and other applications.

6. The method of claim 5, wherein software is provided as a service in the edge layer to host the first application.

7. The method of claim 1, further comprising:
monitoring a second set of network traffic occurring between the migrated components and other applications and a remainder of the plurality of components and other applications;
determining, in response to the monitoring, at least one timing error has occurred between the migrated components and other applications and a remainder of the plurality of components and other applications;
introducing, at the edge layer, a network rate control filter to resolve the timing error, wherein a criteria of the network rate control filter is based on the at least one timing error; and
notifying the user of the criteria.

8. A non-transitory computer program product for migrating complex applications, the computer program product comprising a computer readable storage medium having program instructions embodied therewith, the program instructions executable by a device to cause the device to:
monitor a set of network traffic among a plurality of applications, wherein each of the plurality of applications utilize one or more dependent applications and wherein at least some of the dependent applications are also utilized by one or more of the plurality of applications;
generate, from the set of monitored network traffic, a communication graph, wherein the communication graph includes an average latency between the respective pluralities applications;
identify, from the average latencies of the communication graph, some of the applications for migration;
migrate only the identified applications to an edge layer; and
notify a user of the migration.

9. The computer program product of claim 8, wherein generating the communication graph further comprises:
identifying a server address and a port number for each of the applications;
identifying, using the server address and the port number, a set of client requests associated with each of the applications; and
generating, from the identified set of client requests, the communication graph.

10. The computer program product of claim 9, wherein the communication graph further includes:
a set of addresses and port numbers correlating to a set of origins for the set of client requests;
a set of addresses and port numbers correlating to a set of destinations for the set of client requests; and
a volume of network traffic.

11. The computer program product of claim 10, wherein identifying the migratable components and other applications further comprises:
analyzing the communication graph to identify one or more groups of related applications; and
determining, from the one or more groups of related applications, a set of applications for migration.

12. The computer program product of claim 11, wherein the edge layer includes an appliance based on native architecture of a first application from migratable components and other applications.

13. The computer program product of claim 12, wherein software is provided as a service in the edge layer to host the first application.

14. The computer program product of claim 8, wherein the program instructions further cause the device to:
monitor a second set of network traffic occurring between the identified applications and a remainder of the applications;
determine, in response to the monitoring, at least one timing error has occurred between the migrated applications and the remainder of the plurality of applications;
introduce, at the edge layer, a network rate control filter to resolve the timing error, wherein a criteria of the network rate control filter is based on the at least one timing error; and
notifying the user of the criteria.

15. A system for migrating complex applications, the system comprising:
a memory subsystem, with program instructions included thereon; and
a processor in communication with the memory subsystem, wherein the program instructions cause the processor to:
monitor a set of network traffic among a plurality of applications, wherein each of the plurality of applications comprises a plurality of components and wherein at least some of the components are interconnected with other applications;
generate, from the set of monitored network traffic, a communication graph, wherein the communication graph includes an average latency between the respective pluralities of components and other applications;
identify, from the average latencies of the communication graph, some of the components and other applications for migration;
migrate the identified components and the identified other applications to an edge layer; and
notify a user of the migration.

16. The system of claim 15, wherein generating the communication graph further comprises:
identifying a server address and a port number for each of the components and other applications;
identifying, using the server address and the port number, a set of client requests associated with each of the components and other applications; and
generating, from the identified set of client requests, the communication graph.

17. The system of claim 16, wherein the communication graph further includes:
a set of addresses and port numbers correlating to a set of origins for the set of client requests;
a set of addresses and port numbers correlating to a set of destinations for the set of client requests; and
a volume of network traffic.

18. The system of claim 17, wherein identifying the migratable components and other applications further comprises:
analyzing the communication graph to identify one or more groups of related components and other applications; and
determining, from the one or more groups of related components and other applications, a set components and other applications for migration.

19. The system of claim 18, wherein the edge layer includes an appliance based on native architecture of a first application from migratable components and other applications.

20. The system of claim 15, wherein the program instructions further cause the processor to:

monitor a second set of network traffic occurring between the migrated components and other applications and a remainder of the plurality of components and other applications;
determine, in response to the monitoring, at least one timing error has occurred between the migrated components and other applications and a remainder of the plurality of components and other applications;
introduce, at the edge layer, a network rate control filter to resolve the timing error, wherein a criteria of the network rate control filter is based on the at least one timing error; and
notifying the user of the criteria.

\* \* \* \* \*